(12) United States Patent
Kobori

(10) Patent No.: US 8,034,146 B2
(45) Date of Patent: Oct. 11, 2011

(54) FILTER ELEMENT, METHOD OF MANUFACTURE AND USE

(75) Inventor: Satoru Kobori, Ibaraki (JP)

(73) Assignee: Japan Vilene Company, Ltd., Koga-Shi (JP)

( * ) Notice: Subject to any disclaimer, the term of this patent is extended or adjusted under 35 U.S.C. 154(b) by 457 days.

(21) Appl. No.: 11/840,305

(22) Filed: Aug. 17, 2007

(65) Prior Publication Data

US 2008/0047430 A1    Feb. 28, 2008

(30) Foreign Application Priority Data

Aug. 17, 2006   (JP) .................................. 2006-222538

(51) Int. Cl.
*B01D 39/16* (2006.01)
*B01D 46/52* (2006.01)
*B01D 53/00* (2006.01)

(52) U.S. Cl. ................. 55/528; 55/486; 55/497; 55/521; 55/DIG. 5; 95/283; 96/134; 96/135; 96/154

(58) Field of Classification Search ............ 55/486, 55/487, 497, 521, 527, 528, DIG. 5; 95/283; 96/134, 135, 153, 154

See application file for complete search history.

(56) References Cited

U.S. PATENT DOCUMENTS

| 4,259,096 A | * | 3/1981 | Nakamura et al. .............. 96/138 |
| 4,765,915 A | * | 8/1988 | Diehl ............................. 210/767 |
| 6,171,369 B1 | * | 1/2001 | Schultink et al. ................. 95/57 |
| 6,200,368 B1 | * | 3/2001 | Guerin et al. .................... 96/135 |
| 6,228,152 B1 | * | 5/2001 | Guerin et al. .................... 96/135 |
| 7,572,322 B2 | * | 8/2009 | Bohringer et al. .............. 96/134 |
| 2005/0210844 A1 | * | 9/2005 | Kahlbaugh et al. ............ 55/486 |
| 2008/0148946 A1 | * | 6/2008 | Lotgerink-Bruinenberg .... 96/55 |
| 2008/0276805 A1 | * | 11/2008 | Lotgerink-Bruinenberg .... 96/75 |

FOREIGN PATENT DOCUMENTS

WO   WO 2006096486 A2  *  9/2006

* cited by examiner

*Primary Examiner* — Robert Clemente
(74) *Attorney, Agent, or Firm* — Hiroe & Associates; Taras P. Bemko

(57) ABSTRACT

The invention provides a filter element which has a reduced initial pressure loss, can reduce an energy cost and can secure a high air flow rate, a filter element which has an elongated gas removing service life and filtering service life while keeping a high gas removing performance and a high dust removing efficiency, a manufacturing method and a method of use of the same. In a filter element (10) in which a pleated composite substrate (11) obtained by lapping or laminating an nonwoven fabric sheet including a fiber constituted by a thermoplastic resin and a gas removal sheet is pleated, and a pleated shape of the pleated composite substrate (11) is held by a shape retaining member (12*a*), a thickness of the nonwoven fabric sheet is increased at least 5% when heated to 60 degree C.

16 Claims, 4 Drawing Sheets

FILTER ELEMENT, METHOD OF MANUFACTURE AND USE

TECHNICAL FIELD

The present invention relates to a filter element used as a gas removing filter such as a package filter, a fan coil unit, a central air conditioning filter unit or the like installed in a building, a factory, an office or the like in addition to a filter element used by being installed to an air conditioning equipment in a living environment such as an air cleaner for a motor vehicle or for household use, a manufacturing method and a using method of the same, and more particularly to a filter element which is excellent in a gas removing capacity and a gas removing service life, is excellent in a filtering service life or a dust holding capacity and has a little initial pressure loss, a manufacturing method and a using method of the same.

BACKGROUND ART

There has been conventionally used an air cleaner filter which is set in a house and a cabin filter which is installed in an inner portion of an air conditioner within a passenger room of a motor vehicle and an air cleaner installed in a ceiling within the passenger cabin or on a panel at the back of a rear seat so as to clean the indoor air, and which clean outdoor and indoor air. And in this cabin filter or air cleaner, a filter element is used in accordance with an aspect that an air filter base material including a gas decomposing particle or a gas adsorbing particle serving as a gas removing particle is pleated.

In the case of the filter element mentioned above, if the gas removing particle is covered with dust or the like, there is a problem that the gas removing performance is lowered, and the gas removing service life becomes shorter. Accordingly, there is devised such as to efficiently operate functions for deodorizing and removing harmful gas by the gas removing particles after previously removing the dust by a filter element for removing the coarse dust, by laminating or integrating the filter media for removing the coarse dust and a base material including the gas removing particle. As the filter element mentioned above, for example, there has been known a deodorant filter material unit in patent document 1.

However, if the filter media for removing the coarse dust is laminated on the base material including the gas removing particles, a pressure loss of the filter element becomes too large, so that there is generated a problem that an energy cost of the air cleaner or the like becomes high or the gas removing function can not be sufficiently achieved. Accordingly, the filter media for removing the coarse dust is required to have a dust removing efficiency as high as possible and to have a filtering service life as long as possible, in addition to making a pressure loss as small as possible so as to secure a high air flow rate.

If a filter material for removing a coarse dust having a small thickness is used for the requirement, there is obtained an advantage that the pressure loss of the filter element is reduced, and the high gas quantity can be secured. However, there is a problem that a space holding the dust is reduced and the filtering service life of the filter element is shortened.

Further, in the case that the filter material for removing the coarse dust having a large thickness is conversely used, there is obtained an advantage that the space holding the dust is increased and the filtering service life is elongated. However, on the contrary, there is a problem that the pressure loss of the filter element becomes high, the energy cost is increased and the high air flow rate can not be secured.

Patent Document 1
Japanese Unexamined Patent Publication No. 11-254958

DISCLOSURE OF THE INVENTION

Problem to be Solved by the Invention

An object of the present invention is to solve the problems mentioned above, and to provide a filter element which has a reduced initial pressure loss, can reduce an energy cost and can secure a high gas flow rate, a filter element which has an elongated gas removing service life and filtering service life while keeping a high gas removing performance and a high dust removing efficiency, a manufacturing method and a method of use of the same.

Means for Solving the Problem

In order to achieve the object mentioned above, in accordance with first to sixth aspects of the present invention, as shown in FIG. 1, there is provided a filter element 10 in which a composite substrate 11 obtained by lapping or laminating a nonwoven fabric sheet containing thermoplastic resin fibers and a gas removal sheet is pleated, and a pleated shape of the pleated composite substrate 11 is held by a shape retaining member 12a, wherein a thickness of the nonwoven fabric sheet is increased 5% or more when heated to 60 degree C.

In accordance with a seventh aspect of the present invention, there is provided a manufacturing method of a filter element comprising the steps of:
  preparing a web comprising thermoplastic resin fibers;
  passing first hot air heated above the melting point of the resin at a first velocity through the web to bond the fibers;
  passing second hot air heated below the melting point of the resin through the web at a second velocity greater than the first velocity to compact the web and providing a nonwoven fabric sheet;
  lapping or laminating the nonwoven fabric sheet on a gas removal sheet and providing a lapped or laminated composite substrate;
  providing the composite substrate with pleats; and
  providing at least one shape retaining member to retain the pleats.

In accordance with an eighth aspect of the present invention, there is provided a method of use of a filter element, the filter element comprising a pleated composite substrate comprised of a gas removal sheet and a nonwoven fabric sheet containing thermoplastic resin fibers which is lapped or laminated on the gas removal sheet, the filter element further comprising shape retaining member, the method of use comprising the step of using the filter element at a temperature between 50 degree C. and 80 degree C. to increase the thickness of the nonwoven fabric sheet at least 5%.

Effect of the Invention

In accordance with the present invention, it is possible to provide with the filter element which has the reduced initial pressure loss, can reduce the energy cost and can secure the high air flow rate, and the filter element which has the elongated gas removing service life and filtering service life while keeping the high gas removing performance and the high dust removing efficiency.

BEST MODE FOR CARRYING OUT THE INVENTION

Figure 1:
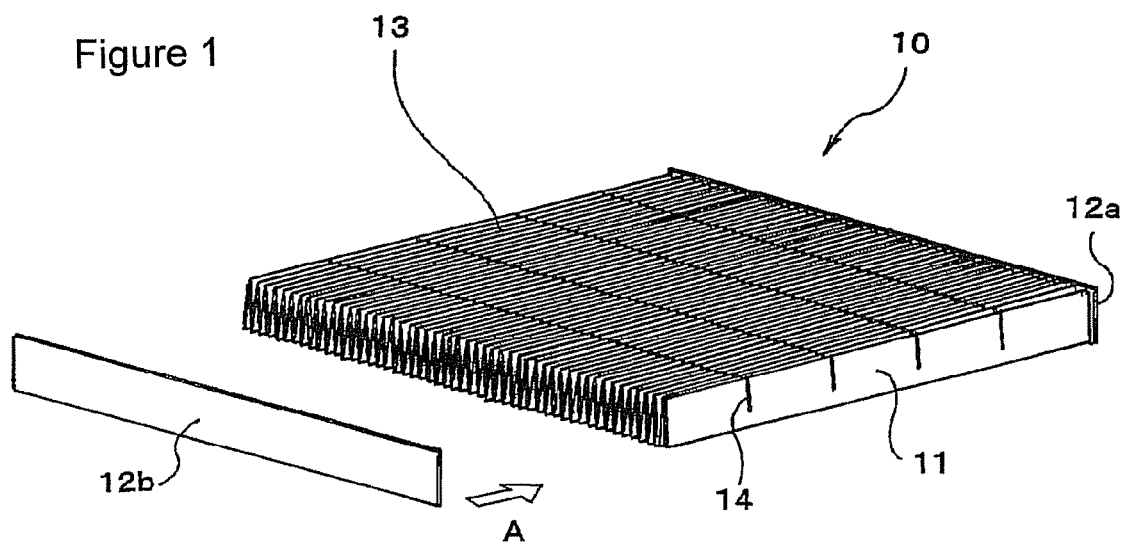
FIG. 1 is a perspective view showing an embodiment of a filter element in accordance with the present invention, and a view exemplifying an aspect that shape retaining member is installed in a direction of an arrow A.

A description will be in detail given below of preferable embodiments of a filter element, a manufacturing method and a using method of the same. In this case, the manufacturing method and the using method of the filter element in accordance with the present invention will be described in the description of the filter element. As shown in FIGS. 1 to 7, the filter element 10 in accordance with the present invention is structured such that a pleated composite substrate 11 obtained by lapping or laminating a nonwoven fabric sheet 1 including a fiber constituted by a thermoplastic resin and a gas removal sheet 2 is pleated, and the pleated shape is held by a shape retaining member 12a.

In the filter element in accordance with the present invention, it is necessary that the fiber constituting the nonwoven fabric sheet includes the fiber constituted by the thermoplastic resin, however, as the fiber constituted by the thermoplastic resin, there is a synthetic resin which is generally used for manufacturing the nonwoven fabric, and there can be listed up, for example, a polyester fiber such as a polyethylene terephthalate, a polybutylene terephthalate or the like, an polyamide fiber such as a nylon 6, a nylon 66 or the like, a polyolefin fiber such as a polypropylene, a polyethylene or the like, an acrylic fiber such as a polyacrylonitrile or the like, a polyvinyl alcohol fiber and the like. Among these fibers, in order to improve a filtering performance of the filter element, the polyolefin fiber having an excellent electrostatic property is preferable.

Further, the fiber constituted by the thermoplastic resin can be constituted by a thermal adhesive fiber. As the thermal adhesive fiber, there are, for example, a fiber constituted by a single resin component having a lower melting point than the other fibers and capable of thermally adhering these other fibers, and a compound fiber having a low melting point component having a lower melting point than the other fibers on its surface and capable of thermally adhering these other fibers. The compound fiber mentioned above includes a compound fiber, for example, of a core-sheathed type having the low melting point component on the fiber surface, a side-by-side type or the like, and includes a compound fiber in which a material is constituted by a combination of fiber forming copolymer, for example, a copolymer polyester/polyester, a copolymer polypropylene/polypropylene, a polypropylene/polyamide, a polyethylene/polypropylene, a polypropylene/polyester, a polyethylene/polyester and the like. Among these fibers, in order to improve the filtering performance of the filter element, the composite fiber constituted by the polyolefin fiber forming copolymer having an excellent electrostatic property is preferable.

Further, it is preferable that the fiber constituted by the thermoplastic resin is a staple fiber having a fiber length of 15 to 100 mm, and a number of crimp of 5 to 30 per inch. Since a crimping process is applied to the staple fiber so as to be opened by a card machine or the like, a bulky nonwoven fabric sheet is formed, and there is obtained an effect that a repulsive force is excellent in a thickness direction against a compression, and a strain of the fiber generated in the nonwoven fabric sheet tends to be cancelled.

In this case, the fiber constituting the nonwoven fabric sheet can include a semi synthetic fiber such as a rayon or the like, or a natural fiber such as a cotton, a pulp fiber and the like, in order to improve a function of the filter element, in addition to the fiber constituted by the thermoplastic resin. However, it is necessary to hold a mixing rate of the other fibers within a range by which the characteristic of the filter element is not lost, and it is preferable that the mixing rate is equal to or less than 30 mass % with respect to an entire of the nonwoven fabric sheet, and it is more preferable that it is equal to or less than 15 mass %. Further, a rate of the thermal adhesive fiber with respect to the entire of the nonwoven fabric sheet is preferably between 100 and 5 mass %, more preferably between 100 and 50 mass %, and further preferably between 100 and 75 mass %. If the rate of the thermal adhesive fiber is less than 5 mass %, a binding force due to the thermal adhesion is weak, a thickness of the filter element is easily collapsed by a wind pressure, and there is a case that the filtering service life becomes short. Further, an average size of the fiber in the nonwoven fabric sheet is preferably between 0.1 and 30 decitex, more preferably between 0.5 and 20 decitex and further preferably between 1 and 10 decitex.

The nonwoven fabric sheet is not particularly limited as far as the thickness thereof is increased 5% or more on the basis of the heating at 60 degree C., and can employ the nonwoven fabric formed in accordance with a normal nonwoven fabric manufacturing method, such as a dry method, a wet method, a spun-bonding method, a melt-blown method, an electrostatic fiber forming method, a flash fiber forming method or the like. It is preferable to employ the nonwoven fabric obtained by a manufacturing method generally called the dry method, in accordance with a method of forming a staple fiber to a fiber web by using the card machine, an air-ray apparatus or the like and thereafter binding the constituting fibers on the basis of an adhesion by using an adhesive fiber or an adhesive agent, among these manufacturing methods. In the nonwoven fabric in accordance with the dry method, since a lot of fibers are oriented in a thickness direction, the thickness is great, the thickness is hard to be collapsed, the repulsive force is excellent in the thickness direction against the compression, and the strain of the fiber generated in the nonwoven fabric tends to be cancelled. In the case of forming in accordance with the spun-bonding method and the melt-blown method, it is possible to employ a method of binding the constituting fibers in accordance with the adhesion after blowing the adhesive staple fiber constituted by the thermoplastic resin so as to form a fiber fleece in which a long fiber and a short fiber are integrated, at a time of spinning out the fiber constituted by the thermoplastic resin from a nozzle.

As a more preferable nonwoven fabric sheet, there can be listed up a nonwoven fabric sheet in which the constituting fibers of the fiber web are combined with each other by forming the constituting fiber including the fiber constituted by the thermoplastic resin into the fiber web by using the card machine, the air-ray apparatus or the like, and next getting a heated air having a temperature equal to or more than a melting point of the thermoplastic resin of the fiber constituted by the thermoplastic resin included in the fiber web there through.

Further, in the manufacturing method of the nonwoven fabric sheet mentioned above, it is possible to use a method of entangling the fibers with the formed fiber web by a needle punch so as to combine the fibers.

The filter element in accordance with the present invention has a characteristic that the thickness of the nonwoven fabric sheet is increased 5% or more by being heated at 60 degree C. The increase of the thickness of the nonwoven fabric sheet can be confirmed by circulating the heated air (60 degree C.) in the filter element or the nonwoven fabric sheet at a face velocity of 25 cm/sec for 100 hours. Since the filter element in accordance with the present invention has the characteristic that the thickness is increased 5% or more by being heated at 60 degree C. as mentioned above, there is an advantage that the thickness of the nonwoven fabric sheet is increased 5% or more by using the filter element in the heated atmosphere having the temperature equal to or more than 60 degree C., thereby elongating the service life of the filter element.

In this case, the heating means not only artificially heating but also non-artificially heating the nonwoven fabric sheet. It includes, for example, non-artificially heating an air filter unit formed by attaching a filter element to a rigid frame by installing the air filter unit in an inner portion of an air conditioner within a passenger room of a motor vehicle and leaving the motor vehicle, for example, in a summer boiling weather. As mentioned above, in the case of heating the filter element by using the filter element under the atmosphere having the temperature equal to or more than 60 degree C., there is obtained an advantage that it is possible to elongate the service life of the filter element without using any special heating apparatus or operation.

The thickness of the nonwoven fabric sheet is increased 5% or more by being heated at 60 degree C., however, as far as the rate of the thickness increase is equal to or more than 5%, or as far as the function of the filter element is not deteriorated, the range between 5 and 65% is preferable for obtaining certainly the effect of elongating the service life of the filter element, which is not particularly limited. In the case that the increase of the thickness is less than 5%, there is a problem that the effect obtained by elongating the service life of the filter element is small with respect to a cost for adding the function. Further, as an upper limit of the thickness increase, since there is a case that the portion through which the air does not pass becomes too large due to the increase of the thickness, and the service life of the filter element is lowered on the contrary, the increase of the thickness is preferably equal to or less than 100%, more preferably equal to or less than 65%, and most appropriately equal to or less than 50%.

The nonwoven fabric sheet having the characteristic that the thickness is increased 5% or more by being heated at 60 degree C. can be obtained, for example, by the following manner. A heating process is applied by a lower temperature than the melting point of the fiber constituting the nonwoven fabric sheet under a compressed state, to the nonwoven fabric sheet including the fiber constituted by the thermoplastic resin, which is obtained by the manufacturing method of the nonwoven fabric sheet, explained in the structure of the nonwoven fabric sheet mentioned above. More preferably, the heated air having the temperature less than the melting point of the thermoplastic resin is get through the fiber web at a second speed higher than the first passing speed of the heated air, in such a manner that the fiber web becomes in the compressed state, in the fiber web in which the constituting fibers are combined with each other by getting the heated air having the temperature equal to or more than the melting point of the thermoplastic resin therethrough. In this case, it is preferable to heat at a temperature which is 5 to 100 degree C. lower than the lowest melting point in the melting points of the fibers constituted by the thermoplastic resins, it is more preferable to heat at a temperature which is 5 to 60 degree C. lower, and it is further preferable to heat at a temperature which is 5 to 30 degree C. lower.

As the method of getting the heated air having the temperature less than the melting point of the thermoplastic resin through the fiber web at the second speed higher than the first passing speed of the heated air in such a manner that the fiber web becomes in the compressed state, in the fiber web in which the constituting fibers are combined with each other by getting the heated air having the temperature equal to or more than the melting point of the thermoplastic resin therethrough, mentioned above, specifically there is, for example, a method of forming a fiber web constituted by a compound fiber having a thermoplastic resin having a melting point of 140 degree C. for a sheath component, applying a heating and adhering process to the fiber web under a condition of a hot air passing speed 6 m/sec by a hot air at 140 degree C. by using an air through type dryer, forming a fiber adhered web in which the constituting fibers are combined with each other, next applying a heating and compressing process to the fiber adhered web under a condition of the hot air passing speed of 10 m/sec by the hot air at 130 degree C. by using the other air through type dryer, and obtaining the nonwoven fabric sheet. In this case, in this method, two air through type dryers are not necessarily required, but it is possible to form the fiber adhered web in which the constituting fibers are combined with each other by a front stage portion of the air through type dryer, and execute the heating and compressing process by a rear stage portion of the same air through type dryer. Since only one air through type dryer is necessary by structuring as mentioned above, a more preferable method can be provided.

The strain stays in the constituting fiber of the nonwoven fabric sheet by executing the process mentioned above. As a result, the strain can be dissolved by being thereafter heated at 60 degree C., and it is possible to obtain an effect that the bulk (the thickness) of the nonwoven fabric sheet is expanded and recovered. Further, in accordance with the method mentioned above, since the compressing effect is more largely applied by the wind pressure in accordance with the lower surface of the nonwoven fabric sheet, it is possible to obtain a structure in which a density gradient is formed such that a fiber density is coarse in an upper surface of the nonwoven fabric sheet, and the fiber density is increased in accordance with the lower surface. If the density gradient mentioned above is formed, there can be obtained an effect of elongating the filtering service life of the filter element.

A mass per unit area of the nonwoven fabric sheet is preferably between 15 and 350 g/m$^2$, more preferably between 15 and 250 g/m$^2$, and further preferably between 20 and 150 g/m$^2$. Further, taking the pleating process into consideration, the thickness of the nonwoven fabric sheet is preferably between 0.2 and 5 mm, more preferably between 0.3 and 3 mm, and further preferably between 0.4 and 2 mm. If it is less than 0.2 mm, there is a case that the filtering service life becomes short, and a target filtering performance can not be obtained. Further, if it is more than 5 mm, a portion which does not contribute to the filtration of the gas or contributes thereto in an extremely small level at a time of applying the pleating (hereinafter, refer to as a dead space) is increased, resulting in that the filtering service life becomes shorter on the contrary, and there is a case that the target filtering performance can not be obtained.

The nonwoven fabric sheet in the filter element in accordance with the present invention can employ a compound aspect lapped or laminated on the other raw material, for example, a nonwoven fabric, a woven fabric, a knit fabric, a net or the like, for the purpose of reinforcing.

It is preferable that the filtering function of the nonwoven fabric sheet functions as a coarse dust removing filter. Specifically, in accordance with an evaluation on the basis of a weight method by using SAE AC FINE dust in a test method defined in ASHRAE 52.1-1992, it is preferable that a average gravimetric efficiency is between 50 and 99% at a time when the test condition is constituted by the face velocity of 0.25 m/sec, it is more preferable that the average gravimetric efficiency is between 60 and 99%, and it is further preferable that the average gravimetric efficiency is between 70 and 99%. In the case that the average gravimetric efficiency is less than 50%, the coarse dust removal is insufficient, and in the case that the average gravimetric efficiency is more than 99%, the hole opening diameter of the nonwoven fabric sheet becomes too small. Accordingly, the pressure loss between before and behind of the nonwoven fabric sheet immediately reaches a limit, the service life is shortened, and there is a case that it can not be used as the coarse dust removing filter. In this case, the SAE AC FINE dust corresponds to a dust complying with a testing dust defined in A2 (fine) of ISO12103-1 (1997).

Further, in the case that the test condition is constituted by the face velocity of 0.1 m/sec, the initial pressure loss of the nonwoven fabric sheet is preferably equal to or less than 30 Pa, more preferably equal to or less than 20 Pa, and further preferably equal to or less than 10 Pa. Further, in the case that the final pressure loss is set to 200 Pa at the face velocity of 0.25 m/sec, the filtering service life of the nonwoven fabric sheet is preferably equal to or more than the dust holding capacity 5 $g/m^2$, more preferably equal to or 10 $g/m^2$, and further preferably equal to or more than 15 $g/m^2$. In this case, since the filtering service life is shortened (the dust holding capacity is reduced) if it is intended to make the value of the average gravimetric efficiency of the nonwoven fabric sheet higher, and the value of the average gravimetric efficiency is lowered if it is intended to elongate the filtering service life (if it is intended to increase the dust holding capacity), it is possible to preferably use as the coarse dust removing filter by applying the pleating process as far as the nonwoven fabric is the nonwoven fabric within the preferable range mentioned above.

In order to more improve the filtering performance of the nonwoven fabric sheet so as to obtain the filtering performance which can be evaluated not only by a colorimetric method but also by a counting method, there is a method of applying an electrostatic process to the nonwoven fabric sheet so as to make the constituting fiber to statically charged. There has been known that in the electret fiber, an effect of electret is lost by being heated at a comparatively high temperature. Accordingly, it is preferable to execute the electrostatic process after forming the nonwoven fabric sheet in accordance with the heating process.

In this case, it is preferable to clean and remove an attached oil or remove the oil component, or at the same time of entangling of the constituting fiber on the basis of a water flow effect, before making the nonwoven fabric sheet to electret fabric. However, in accordance with the method mentioned above, it is necessary to increase a process or add a new equipment, and there is a problem that a manufacturing cost is expensive or the like. Accordingly, for example, as disclosed in Japanese Unexamined Patent Publication No. 2002-339256, it is more preferable to form the nonwoven fabric sheet by using a polyolefin thermal adhesive fiber which is constituted by a polyolefin thermal adhesive fiber to which 0.2 to 0.6 weight % of oil is attached, and in which the oil attached amount of the nonwoven fabric can be reduced to 0.001 to 0.2 weight %, and the reducing rate of the oil attached amount can become equal to or more than 60%, at a time of forming the nonwoven fabric in accordance with the heating process (at a time of getting the heated air having the temperature equal to or more than the melting point of the thermoplastic resin therethrough) and/or at a time of the heating process after forming the nonwoven fabric (at a time of getting the heated air having the temperature less than the melting point of the thermoplastic resin there through), and thereafter apply the electrostatic process so as to make the constituting fiber to electret fiber. In this case, the polyolefin thermal adhesive fiber mentioned above corresponds to the fiber to which the oil, for example, having an ester of a polyethylene glycol of a molecular weight between 400 and 800 and a fatty acid of a carbon number between 10 and 20 as a main component is attached.

It is preferable that the filtering performance after the electrostatic process of the nonwoven fabric is applied functions as a fine dust removing filter. Specifically, evaluating in accordance with the weight method by using SAE AC FINE dust, in the test method defined in ASHRAE 52.1-1992, it is preferable that the average gravimetric efficiency (average ASHRAE arestance) is between 50 and 99% at a time when the test condition is constituted by the face velocity 0.25 m/sec, it is more preferable that the average gravimetric efficiency is between 60 and 99%, and it is further preferable that the average gravimetric efficiency is between 70 and 99%. In the case that the average gravimetric efficacy is less than 50%, the coarse dust removal is insufficient, and in the case that the average gravimetric efficacy is more than 99%, the hole opening diameter of the nonwoven fabric sheet becomes too small. Accordingly, the pressure loss between before and behind of the nonwoven fabric sheet immediately reaches a limit, the service life is shortened, and there is a case that it can not be used as the coarse dust removing filter. Further, evaluating in accordance with the counting method by using an atmospheric air dust of 0.3 μm in the test method defined in JIS B9908 type 1, when the test condition is constituted by the face velocity 0.1 m/sec, it is preferable that the particle collecting efficiency is between 5 and 50%, it is more preferable that the particle collecting efficiency is between 10 and 50%, and it is further preferable that the particle collecting efficiency is between 20 and 50%.

Next, a description will be given of the gas removal sheet lapped or laminated on the nonwoven fabric sheet. As the gas removal sheet, there can be listed up an aspect that a gas removing particle such as a gas decomposing particle, a gas adsorbing particle or the like is included in a sheet-shaped or mat-shaped base material having an air permeability, and an aspect that the gas removing particles are coupled by a resin.

As the sheet-shaped or mat-shaped base material having the air permeability, there can be listed up a porous body such as a nonwoven fabric, a woven fabric, a film, a filter paper, a sponge and the like, the nonwoven fabric is preferable among them because it has a high air permeability.

The gas removing particle is a solid particle which is used for removing an uncomfortable odor material or the like or is used for removing a gaseous pollutant included in an air or an ambient atmosphere in a production facility, a clean room or the like for a semiconductor or a liquid crystal, and can adsorb the gaseous material, change the gaseous material into an easily adsorbed material or decompose the gaseous material.

As the solid particle as mentioned above, there are, for example, an active carbon, a zeolite, various chemical adsorbents, an ion exchanger resin, catalysts such as a photocatalyst and the like, and it is possible to appropriately select and use one kind or two or more kinds from them. In the gas removing particles mentioned above, the active carbon which is excellent in a capacity of adsorbing various gaseous materials is preferable. In the case of using the active carbon, it is preferable to employ a porous material in which a specific surface area is equal to or more than 200 $m^2/g$, it is more preferable that the specific surface area is equal to or more than 500 $m^2/g$, and it is further preferable that the specific surface area is equal to or more than 800 $m^2/g$.

Further, as for a particle diameter of the gas removing particle, it is preferable that an average particle diameter is between 0.147 mm (100 mesh) and 1.65 mm (10 mesh) for achieving both a high efficiency and a low pressure loss. Further, it is preferable to set the average particle diameter between 0.212 mm (70 mesh) and 0.85 mm (20 mesh). In the case of using the gas removing particle having a fine average particle diameter in which the average particle diameter is less than 0.147 mm (100 mesh), there is a case that a problem that an initial gas removing efficiency can be set high, but the pressure loss is enlarged. Further, in the case of using the gas removing particle having a coarse average particle diameter in which the average particle diameter gets over 1.65 mm (10 mesh), there is a case that a problem that the initial gas removing efficiency become insufficient.

As a preferable aspect of the gas removal sheet, there is a gas removing filter material obtained by holding the gas removing particle in a space of the mat-shaped material constituted by the resin component having an air permeability and having a thermal melting property, melting the mat-shaped material in accordance with a heating process, and fixing the gas removing particle. As the mat-shaped material having the air permeability as mentioned above, there can be listed up the porous material such as the nonwoven fabric, the woven fabric, the film, the filter paper, the sponge and the like, and the nonwoven fabric is preferable among them because the air permeability is high. In the case of the nonwoven fabric, for example, it is possible to apply a nonwoven fabric including an adhesive fiber constituted by one component having a melting point equal to or lower than 160 degree C., or an adhesive compound fiber constituted by two or more components including a low melting point component equal to or lower than 160 degree C. or the like.

Figure 4:
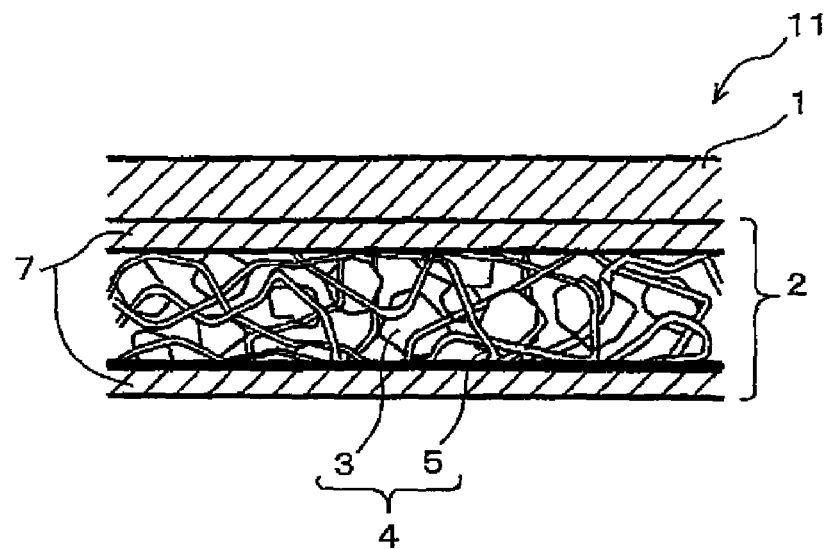
FIG. 4 is an enlarged cross sectional view of a main portion showing a composite substrate of a filter element in accordance with the present invention.

FIG. 4 shows an aspect of the gas removal sheet 2 obtained by laminating permeable cover materials 7, where 7 is attached to both surfaces of the gas removing particle layer 4 in which the gas removing particle 3 is held between the constituting fibers of the nonwoven fabric 5 constituted by the thermal adhesive fiber so as to be formed in the mat shape. The gas removing particle layer 4 having the structure mentioned above can be obtained, by holding the gas removing particle 3 in the space between the constituting fibers of the nonwoven fiber 5 (the mat-shaped material), for example, having the air permeability and constituted by the thermal adhesive fiber, and thereafter thermally melting the thermal adhesive fiber constituting the nonwoven fabric 5 in accordance with the heating process so as to adhere the gas removing particle between the fibers or between the fiber surfaces. Further, FIG. 4 shows an aspect of the pleated composite substrate 11 in which the nonwoven fabric sheet 1 is adhered to one surface of the cover material 7 of the gas removal sheet 2 mentioned above.

As the other preferable aspect of the gas removal sheet, there is a gas removing filter material in which a web constructed by a coupling portion and a resin coagulation portion is formed by plasticizing and melting the mat-shaped material constituted by the resin component having the air permeability and the thermal melting property, and the permeable cover material is lapped or laminated and integrated on both surfaces of the mat-shaped gas removing particle layer structured such that the gas removing particle is firmly fixed to the web via the resin coagulation portion. As the mat-shaped material having the air permeability, there can be listed up the porous body such as the nonwoven fabric, the woven fabric, the film, the filter paper, the sponge or the like, and the nonwoven fabric is preferable among them because it has a high air permeability. In the case of the nonwoven fabric, for example, it is possible to apply the nonwoven fabric including the adhesive fiber constituted by one component having the melting point equal to or lower than 160 degree C., the adhesive compound fiber constituted by two or more components including the low melting point component equal to or lower than 160 degree C. or the like.

Figure 5:
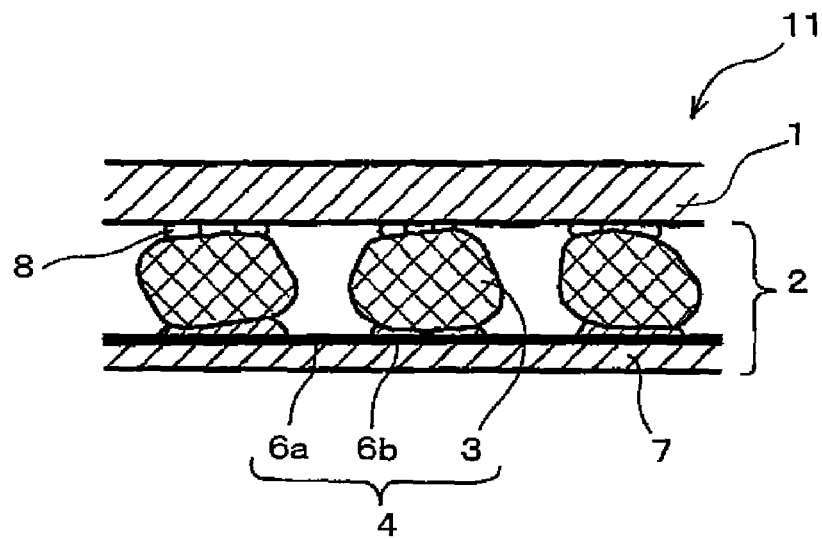
FIG. 5 is an enlarged cross sectional view of a main portion showing the other example of the composite substrate of the filter element in accordance with the present invention.

FIG. 5 shows an aspect of the gas removal sheet 2 constituted by the gas removing particle 3, and a web having a coupling portion 6a and a resin coagulation portion 6b formed by a hot melt resin formed by plasticizing and melting a hot melt nonwoven fabric in which the gas removing particle 3 is firmly fixed to the web via the resin coagulation portion 6b, and formed a mat-shaped gas removing particle layer 4 and obtained by laminating or integrating the permeable cover material 7 to one surface of the mat-shaped gas removing particle layer 4. The gas removing particle layer 4 having the structure mentioned above can be obtained, for example, by arranging the gas removing particle 3 on the surface of the holt melt nonwoven fiber, thereafter plasticizing and melting the hot melt nonwoven fabric in accordance with a heating process, and forming the web having the resin coagulation portion 6b firmly fixing the gas removing particle 3 and the coupling portion 6a connecting between the resin coagulation portions 6b.

Figure 6:
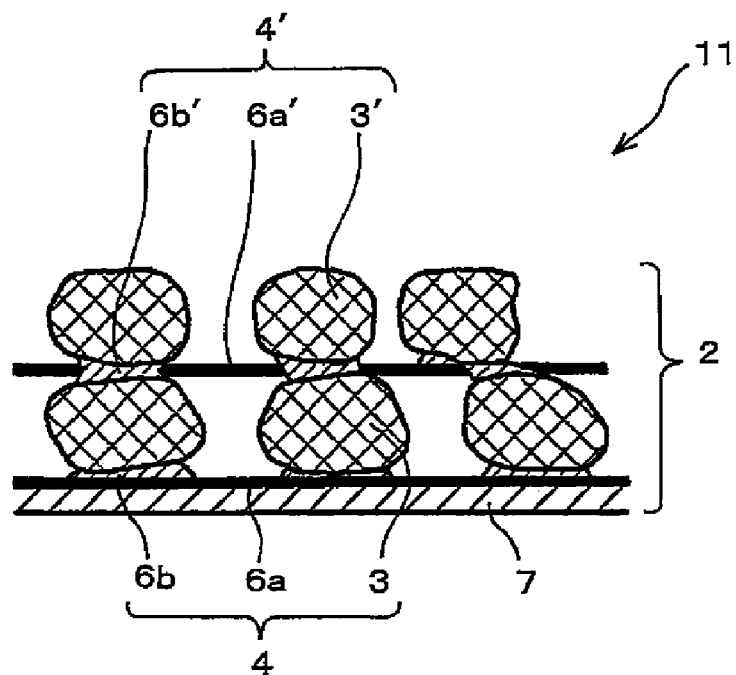
FIG. 6 is an enlarged cross sectional view of a main portion showing the other example of a gas removal sheet of the filter element in accordance with the present invention.

As the other preferable aspect of the gas removal sheet, for example, as exemplified in FIG. 6, there is a gas removing filter material in which a web constructed by a coupling portion and a resin coagulation portion is formed by plasticizing and melting the mat-shaped material constituted by the resin component having the air permeability and the thermal melting property, the mat-shaped gas removing particle layer structured by firmly fixing the gas removing particle via the resin coagulation portion of the web constituted by the coupling portion and the resin coagulation portion is arranged on the firmly fixed side surface of the gas removing particle of the mat-shaped gas removing particle layer structured such that the gas removing particle is firmly fixed to the web via the resin coagulation portion, and the permeable cover material is laminated and integrated on the one gas removing particle layer.

As the mat-shaped material having the air permeability, there can be listed up the porous body such as the nonwoven fabric, the woven fabric, the film, the filter paper, the sponge or the like, and the nonwoven fabric is preferable among them because it has a high air permeability. In the case of the nonwoven fabric, for example, it is possible to apply the nonwoven fabric including the adhesive fiber constituted by one component having the melting point equal to or lower than 160 degree C., the adhesive compound fiber constituted by two or more components including the low melting point component equal to or lower than 160 degree C. or the like.

FIG. 6 shows an aspect of the gas removal sheet 2 constituted by the gas removing particles 3 and 3', and the web having the coupling portions 6a and 6a' and the coagulation portions 6b and 6b', and structured such that the permeable cover material 7 is laminated and integrated on the surface of the gas removing particle layer 4 in the mat-shaped gas removing particle layers 4 and 4' to which the gas removing particles 3 and 3' are firmly fixed by the coagulation portions 6b and 6b'. In this example, there are arranged in the laminating manner the mat-shaped gas removing particle layer 4 to which the gas removing particle 3 is firmly fixed by the coagulation portion 6b, and the mat-shaped gas removing particle layer 4' to which the gas removing particle 3' is firmly fixed by the coagulation portion 6b', and the permeable cover material 7 is laminated and integrated on the laminated material by the coupling portion 6a and the coagulation portion 6b.

More specifically, a plurality of lamination units 4 and 4' are constructed in which the gas removing particles 3 and 3' are firmly fixed to one surface of a web constructed by the coupling portions 6a and 6a' and the resin coagulation portions 6b and 6b' made of the hot melt resin via resin coagulation portions 6b and 6b', and the permeable cover material 7 is laminated on one surface of the hot melt nonwoven fabric for forming the web having the coupling portion 6a and the resin coagulation portion 6b made of the hot melt resin, and the cover material 7 is laminated and integrated by the coupling portion 6a and the resin coagulation portion 6b which are formed at a time of plasticizing and melting the hot melt nonwoven fabric.

As a method of obtaining the gas removing particle layers 4 and 4' having the structure mentioned above, for example, as shown in FIG. 6, there is a method of arranging the gas removing particle 3 on the surface of the hot melt nonwoven fabric, thereafter plasticizing and melting the hot melt nonwoven fabric in accordance with a heating process, forming the web having the coupling portion 6a and the resin coagulation portion 6b, firmly fixing the gas removing particle 3 by the resin coagulation portion 6b, thereafter lapping the hot melt nonwoven fabric in contact with the gas removing particle 3, next arranging the gas removing particle 3' on the surface of the hot melt nonwoven fabric, thereafter plasticizing and melting the hot melt nonwoven fabric, forming the web having the coupling portion 6a' and the resin coagulation portion 6b', and firmly fixing the gas removing particle 3' by the resin coagulation portion 6b'.

It is preferable that a mass per area unit of the gas removal sheet is between 50 and 700 $g/m^2$, it is more preferable that it is between 100 and 550 $g/m^2$, and it is further preferable that it is between 150 and 450 $g/m^2$. Further, taking the application of the pleating work into consideration, the thickness of the gas removal sheet is preferably between 0.2 and 3 mm, and more preferably between 0.3 and 2 mm, and further preferably between 0.4 and 1 mm. If it is less than 0.2 mm, there is a case that target gas removing capacity and gas removing service life can not be obtained. Further, if it gets over 3 mm, there is a case that it is hard to execute the pleating work and the gas removal sheet is broken at a time of applying the pleating work.

As mentioned above, the nonwoven fabric sheet and the gas removal sheet are lapped or laminated, whereby the pleated composite substrate is structured. The lapped or laminated aspect of the nonwoven fabric sheet and the gas removal sheet is not particularly limited as far as the respective base materials are lapped or laminated. It is possible for those sheets to be lapped such that they may be parted. It is preferred that those sheets are laminated or integrated such that they may not be parted. For example, in the case of laminating or integrating both the base materials comprising the nonwoven fabric sheet and the gas removal sheet by using an adhesive agent, there are a method of dispersing the powder-like thermoplastic resin and a thickening agent into a water for keeping the air permeability so as to be formed in a paste shape and be applied to the base material in a dotted shape, and thereafter laminating or integrating by heating, a method of scattering the particle of the hot melt resin to the base material so as to laminate and integrate by heating, and the like. Further, there are a method of laminating or integrating via the hot melt nonwoven fabric by heating, and the like. Further, there are a method of overlapping the nonwoven fabric sheet and the gas removal sheet, putting them between a roll having a flat surface and a heating roll having a concavo-convex surface, partly melting the fiber made of the thermoplastic resin included in the nonwoven fabric sheet, and partly laminating or integrating, and the like. In this case, it is necessary to limit the fusion portion equal to or less than 30% of a whole area, and the fusion portion is preferably equal to or less than 20%.

As mentioned above, the heating work is necessary for laminating the nonwoven fabric sheet and the gas removal sheet, however, the present invention has a risk that the thickness of the nonwoven fabric sheet is recovered by heating. Further, in the case that an electrostatic charging work is applied to the nonwoven fabric sheet, and the constituting fiber is statically charged, there is a risk that an effect of being statically charged is lost by heating. Accordingly, in the present invention, a more preferable aspect is proposed below as the laminated aspect between the nonwoven fabric sheet and the gas removal sheet. In other words, the aspect corresponds to a laminated aspect obtained by a method of applying the hot melt resin simultaneously to both surfaces comprising the respective laminated surfaces of the nonwoven fabric sheet and the gas removal sheet in accordance with a hot melt spray, next laminating two base materials in such a manner that the applied surfaces come to inner sides with each other, thereafter pressurizing two base materials, for example, by putting them between a pair of non-heated rolls, and adhering and integrating two base materials. In accordance with the method mentioned above, since a heat quantity of the applied hot melt resin is a little, the thickness of the nonwoven fabric sheet is not recovered by the heat of the hot melt resin, and the effect of the electrostatic charging is not lost. Further, in the case of obtaining the same peeling strength, it is possible to reduce the amount of the hot melt resin in comparison with the mass per area unit of the hot melt nonwoven fabric, for example, it is possible to set it between 3 and 15 $g/m^2$, and more preferably it is possible to set it between 5 and 10 $g/m^2$. There is obtained an advantage that not only it is possible to make the pressure loss low, but also it is possible to make a material cost low.

In the aspect shown in FIG. 5, there is shown the example of the composite substrate 11 obtained by applying the hot melt resin 8 respectively to the side surface of the gas removing particle 3 of the gas removal sheet 2 and the one surface of the nonwoven fabric sheet 1 in accordance with the hot melt spray, next laminating and pressurizing in such a manner that the applied surfaces of the gas removal sheet 2 and the nonwoven fabric sheet 1 come to the inner sides with each other, and adhering and integrating both the base materials 1 and 2 via the hot melt resin 8.

Figure 7:
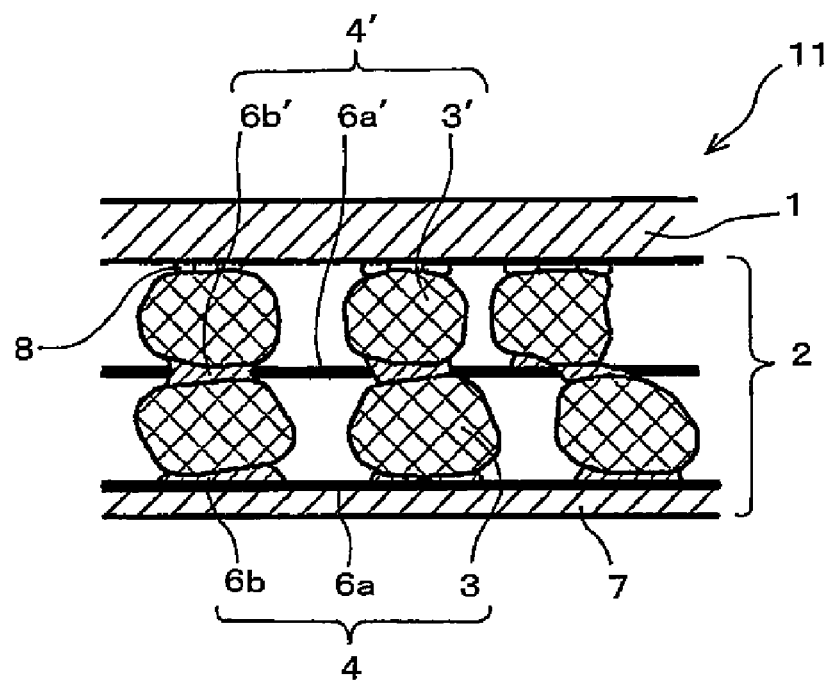
FIG. 7 is an enlarged cross sectional view of a main portion showing a composite substrate in which a nonwoven fabric sheet is laminated and integrated on the gas removal sheet shown in FIG. 6.

Further, in FIGS. 6 and 7, there is shown the example of the composite substrate 11 obtained by applying the hot melt resin 8 respectively to the side surface of the gas removing particle 3' of the gas removal sheet 2, and the one surface of the nonwoven fabric sheet 1 in accordance with the hot melt spray, next laminating and pressurizing in such a manner that the applied surfaces of the gas removal sheet 2 and the nonwoven fabric sheet 1 come to the inner sides with each other, and adhering and integrating both the base materials 1 and 2 via the hot melt resin 8.

As a mass per area unit of the pleated composite substrate obtained by lapping or laminating the nonwoven fabric sheet and the gas removal sheet, it is preferable that it is between 65 and 1000 g/m$^2$, it is more preferable that it is between 150 and 800 g/m$^2$, and it is further preferable that it is between 170 and 600 g/m$^2$. Further, taking the application of the pleating work into consideration, the thickness of the pleated composite substrate is preferably between 0.4 and 6 mm, and more preferably between 0.6 and 4 mm, and further preferably between 0.7 and 3 mm. If it is less than 0.4 mm, there is a case that the filtering service life becomes short and the target filtering performance can not be obtained. Further, if it gets over 5 mm, a portion which does not contribute to the filtration of the gas or contributes extremely a little (hereinafter, refer to as a dead space) is increased, and the gas removing service life and the filtering service life become shorter on the contrary, resulting in that there is a risk that the target gas removing performance and filtering performance can not be obtained.

It is possible to obtain the filter element in accordance with the present invention by pleating the composite substrate structured such that the nonwoven fabric sheet including the fiber made of the thermoplastic resin and the gas removal sheet are lapped or laminated as mentioned above, and holding the pleated shape by the shape retaining member. In this case, in FIG. 1, there is exemplified an aspect that the shape retaining member 12b is installed in a direction of the arrow A to an end surface intersecting a crest line direction of the pleat, in the pleated composite substrate 11. The pleating work of the pleated composite substrate is not limited as far as it is folded in a zigzag shape, and the folding method includes methods by a pleating machine such as a reciprocating type, a rotary type or the like, a method of pressing by a zigzag molded pressing die and the like.

Further, the shape retaining member is not particularly limited as far as it is possible to hold the pleat shape, but it is possible to apply a sheet-like material, for example, a woven or knit fabric, a nonwoven fabric, a synthetic resin sheet, an expanded sheet, a paper, a metal material or a compound thereof. Particularly, in the case of the nonwoven fabric, since it is excellent in a strength, is excellent in a cushioning performance at a time of installing the filter element to the rigid frame and is excellent in a sealing performance with respect to the rigid frame, the nonwoven fabric is preferable. Specifically, it is possible to install the sheet-like material to the end surface intersecting the crest line direction of the pleat by thermally welding or bonding via an adhesive agent or an adhesive sheet. In this case, the shape retaining means is not limited to the sheet-like material, but it is possible to form it by attaching an expanded resin or the like so as to expand. Further, the shape retaining means can be installed to an end surface in parallel to the crest line direction in addition to the end surface intersecting the crest line direction of the pleat.

Figure 2:
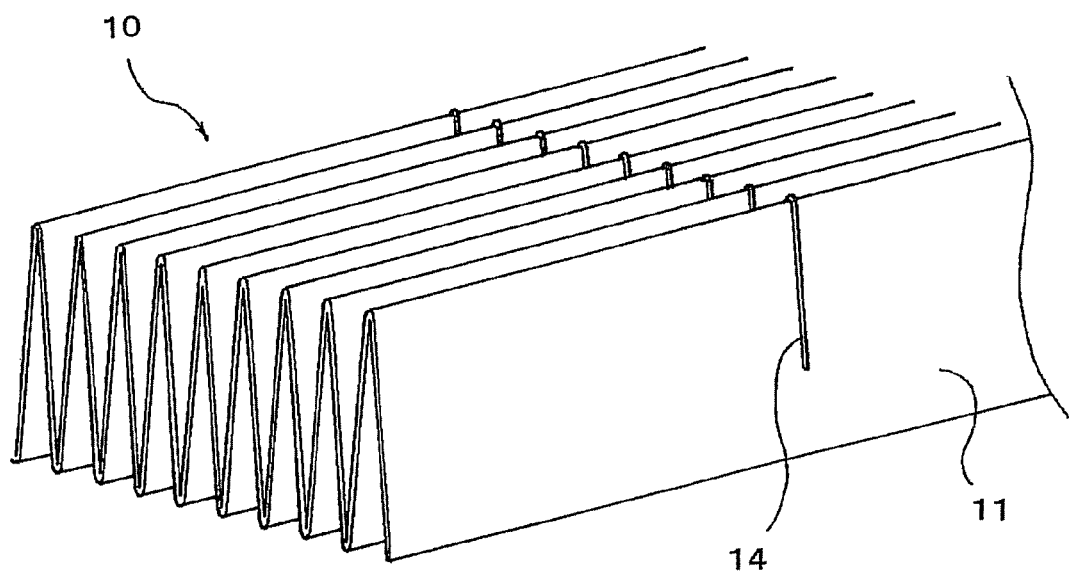
FIG. 2 is an enlarged view of a main portion of the filter element in accordance with the present invention.

It is preferable that the pleated composite substrate 11 is provided with the separator 14 to which the linear resin is attached in parallel while being spaced in the direction intersecting the crest line direction of the pleat, before the pleating process or after the pleating process, as exemplified in FIG. 1 or 2, thereby preventing a slant surface of the crest of the pleat from being brought into contact therewith so as to form a dead space. It is preferable that the attachment of the linear resin is provided in the crest of the pleat intermittently and is not provided in a valley portion of the pleat, as shown in these drawings, and it is preferable that it is provided in bath surfaces of the composite substrate.

Figure 3:
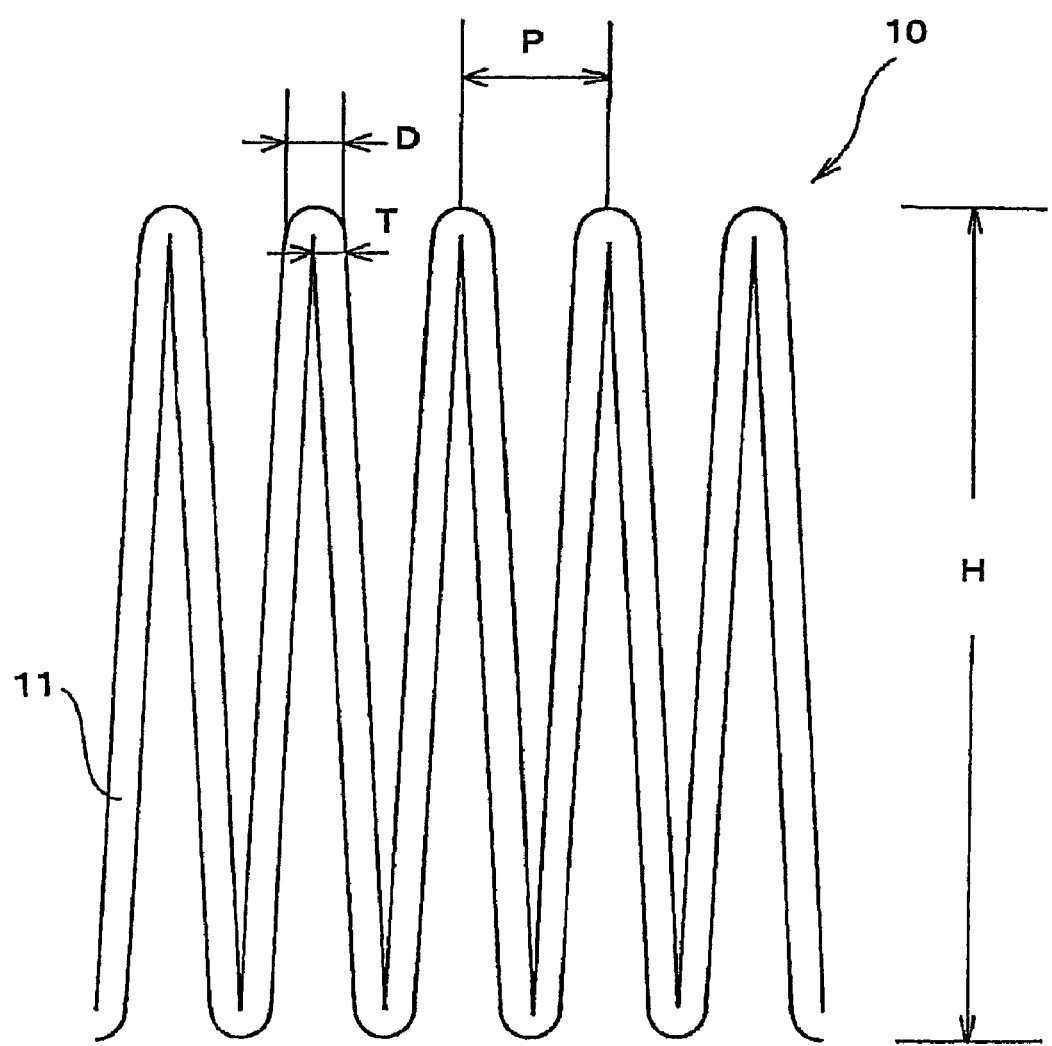
FIG. 3 is a schematic cross sectional view of the pleated filter element in accordance with the present invention.

Further, it is preferable that a lot of crimples 13 are formed in the filter element as exemplified in FIG. 1, specifically, as shown in FIG. 3, a height H of the crimple 13 is preferably between 5 and 150 mm, more preferably between 8 and 100 mm, and further preferably between 15 and 59 mm. Further, a pitch P of the crimples 13 corresponding to a crest interval of the pleat is preferably between 1 and 20 mm, more preferably between 2 and 15 mm, and further preferably between 3 and 10 mm. Further, a ratio P/H between the pitch P (mm) and the height H (mm) is preferably between 0.05 and 0.7, more preferably between 0.05 and 0.5, and further preferably between 0.05 and 0.3. If the ratio P/H is less than 0.05, there is a case that an angle of the crimple becomes too small, resulting in that the angle of the crimples is widened by the wind pressure and crimples are contacted with the adjacent crimples forming the dead space, and there is a case that a dust holding capacity is lowered. Further, if the ratio P/H is more than 0.5, there is a case that the height of the crimples is reduced, and the dust holding capacity is reduced. Further, if the height of the crimples are less than 5 mm, the whole area of the filtering material is reduced, so that there is a case that the dust holding capacity is lowered. If the height of the crimple is more than 150 mm, although the whole area of the filtering material becomes large, the angle of the crimples becomes small and the crimples contact one another, producing dead space, so that there is a case that the dust holding capacity is lowered.

Further, as shown in FIG. 3, on the assumption that a crest interval of the pleat, that is, the pitch of the crimples is set to P (mm), and a thickness of the composite substrate is set to T (mm), an open area ratio "a" calculated in accordance with the following expression is preferably between 10 and 80%, more preferably between 15 and 75% and further preferably between 20 and 70%.

$$a=(1-2T/P)\times100 \qquad \text{Expression}$$

As is apparent from FIG. 3, in the case that the value of the ratio P/H between the pitch P (mm) of the crimples and the height H (mm) is small, a width corresponding to about twice the thickness T (mm) of the nonwoven fabric sheet is approximately equal to a width D (mm) of the dead space.

Accordingly, the more the crest number of the filter element becomes, and the thicker the thickness of the composite substrate becomes, the more the dead space is increased, so that there is a tendency that the air flow rate of the air filter unit is lowered, and the filtering service life is reduced. On the other hand, the more the crest number of the filter element becomes, and the thicker the thickness of the composite substrate becomes, the more the filtering area of the nonwoven fabric sheet is increased, so that there is a tendency that the filtering service life is elongated. Accordingly, the expression mentioned above corresponds to an expression expressing a most preferable state in which both the tendencies are balanced and the filtering service life is elongated. Accordingly, if the open area ratio "a" is less than 10%, the initial pressure loss of the air filter unit is greatly increased, the filtering service life is shortened, and there is a case that the dust holding capacity is lowered. Further, if the open area ratio "a" is more than 80%, the filtering area of the composite substrate is reduced, the filtering service life of the air filter unit is shortened, and there is a case that the dust holding capacity is lowered.

Further, in the case that the filter element is constituted by a filter element used by being installed in a motor vehicle or in an air conditioning device in a living environment such as an air cleaner for a house, in a magnitude of the entire of the filter element, a dimension of one side of an air inflow surface is preferably between 80 and 500 mm, more preferably between 100 and 400 mm, and further preferably between 150 and 300 mm. Further, a depth thereof is preferably between 5 and 100 mm, more preferably between 10 and 50 mm, and further preferably between 15 and 30 mm. Further, in the case of the filter element used as a coarse dust removing filter such as a package filter, a fan coil unit, a central air conditioning filter unit or the like, in an air cleaning apparatus installed in a building, a factory, an office or the like, a dimension of one side of an air inflow surface is preferably between 200 and 1500 mm, more preferably between 300 and 1000 mm, and further preferably between 400 and 700 mm. Further, the depth is preferably between 10 and 500 mm, more preferably between 20 and 400 mm, and further preferably between 30 and 300 mm.

In the case that the filter element is applied to the air conditioning apparatus, the filter element can be used by being installed to the rigid frame. The rigid frame is not particularly limited as far as the material has the rigidity, but a wood material, a metal material, a plastic material or the like is applied, and the wood material is preferable in the case of being burned and disposed after being cleaned and regenerated some times.

It is preferable that the filtering performance of the filter element functions as the coarse dust removing filter. Specifically, evaluating in accordance with the weight method by using SAE AC FINE dust, in the test method defined in ASHRAE 52.1-1992, in the case that the dimension of at least one side of the air inflow surface is between 80 and 500 mm, it is preferable that the average gravimetric efficiency (average ASHRAE arestance) is between 50 and 99% at a time when the test condition is constituted by the air flow rate 550 $m^3$/hr, it is more preferable that the average gravimetric efficiency is between 60 and 99%, and it is further preferable that the average gravimetric efficiency is between 70 and 99%. In the case that the average gravimetric efficiency is less than 50%, the coarse dust removal is insufficient, and in the case that the average gravimetric efficiency is more than 99%, the hole opening diameter of the composite substrate becomes too small. Accordingly, the pressure loss between before and behind of the composite substrate immediately reaches a limit, the service life is shortened, and there is a case that it can not be used as the coarse dust removing filter. In this case, in the case that the dimensions of all the sides of the air inflow surface are more than 500 mm, it is possible to employ the air flow rate 1100 $m^3$/hr as the test condition.

Further, in the case that the dimension of at least one side of the air inflow surface is between 80 and 500 mm, the initial pressure loss of the filter element is preferably equal to or less than 150 Pa, more preferably equal to or less than 120 Pa, and further preferably equal to or less than 100 Pa, at a time when the test condition is constituted by the air flow rate 550 $m^3$/hr. Further, in the case that the final pressure loss is set to 200 Pa, the filtering service life of the filter element is preferably equal to or more than the dust holding capacity 10 g, more preferably equal to or more than 15 g, and further preferably equal to or more than 20 g. Further, the pressure loss of the composite substrates mentioned above is obtained by adding each of the pressure losses of the lapped or laminated nonwoven fabric sheet and gas removal sheet. Further, in the case that the dimensions of all sides of the air inflow surface are more than 500 mm, it is possible to employ the air flow rate 1100 $m^3$/hr as the test condition.

The filter element in accordance with the present invention is constituted by the filter element in which the composite substrate is pleated as mentioned above, and the thickness of the nonwoven fabric sheet is increased 5% or more by heating at 60 degree C. Accordingly, if the filter element or the air filter unit formed by attaching the filter element to the rigid frame is exposed to the heated state at 60 degree C., the filtering performance of the filter element is changed. In detail, the average gravimetric efficiency is hardly changed, and the pressure loss for the increase of the dead space in a vertex portion of the crimple of the nonwoven fabric sheet is increased, however, dust holding capacity of the entirety of the nonwoven fabric sheet is increased. Accordingly, as a comprehensive result, there is obtained an effect that the filtering service life is largely increased. A rate of this increase is preferably equal to or more than 5% with respect to the filtering service life of the original filter element, more preferably equal to or more than 10%, and further preferably equal to or more than 15%.

Next, a description will be given of a method of use of the filter element in accordance with the present invention. The method of use of the filter element in accordance with the present invention is characterized by using the filter element at a temperature between 50 degree C. and 80 degree C. to expand the thickness of the nonwoven fabric sheet containing thermoplastic resin fibers which is lapped or laminated on the gas removal sheet at least 5%.

In the method of use of the filter element in accordance with the present invention, it is preferable that the filter element employs the filter element in accordance with the present invention, that is, the filter element in which the thickness of the nonwoven fabric sheet is increased 5% or more by heating at 60 degree C. A description will be given below by exemplifying a case of using the filter element in accordance with the present invention.

As mentioned above, since the filter element in accordance with the present invention has the characteristic that the thickness thereof is increased 5% or more by heating at 60 degree C., there is obtained an advantage that it is possible to extend the service life of the filter element by using the filter element under the temperature atmosphere at 60 degree C. or more. However, there is a case that the filter element in accordance with the present invention is used under the temperature atmosphere at the temperature less than 60 degree C. in the non-artificial temperature atmosphere at a time of actually using the filter element, for example, there is a case that it is used under the temperature atmosphere at 50 degree C. for one month. Thus, even under the temperature atmosphere at the temperature less than 60 degree C. mentioned above, the thickness may be increased 5% or more for a long time. The temperature atmosphere mentioned above corresponds to one or some of the temperature between 50 and 80 degree C. In other words, if the temperature atmosphere to which the filter element is exposed is less than 50 degree C., there is a case that it is impossible to increase the thickness of the nonwoven fabric sheet 5% or more, and in the case that it is equal to or more than 80 degree C., there is a risk that the constituting member of the filter element is deformed or changed in quality. Further, in order to secure the effect that the problem mentioned above is not generated and the thickness is securely increased 5% or more, the temperature atmosphere between 60 and 80 degree C. is desirable.

Further, it is preferable that the temperature between 50 and 80 degree C. mentioned above is less than the melting point of the thermoplastic resin constituting the fiber included in the nonwoven fabric sheet constituting the filter element. In detail, it is preferably the temperature which is equal to or less than the temperature which is 10 degree C. lower than lowest melting point in the melting points of the fibers constituted by the thermoplastic resin, more preferably the temperature which is equal to or less than the temperature which is 30 degree C. lower than the lowest melting point, and further preferably the temperature which is equal to or less than the temperature which is 50 degree C. lower than the lowest melting point.

In this case, the heating means non-artificially heating the nonwoven fabric sheet, in addition to artificially heating. For example, it includes non-artificially heating the air filter unit formed by attaching the filter element to the rigid frame by installing the air filter unit in the inner portion of the air conditioner within the passenger room of the motor vehicle and leaving the motor vehicle, for example, in a summer boiling weather. In other words, it means using the filter element under the temperature atmosphere between 50 and 80 degree C.

In this case, in the using method in accordance with the present invention, it is possible to use by artificially heating the nonwoven fabric sheet. For example, it is possible to use the air filter unit formed by attaching the filter element to the rigid frame so as to recover the thickness of the nonwoven fabric sheet, by installing the air filter unit to the home air cleaner or the office air conditioning apparatus, using as the air filter to some period, and detaching the air filter unit after the dust is attached, or exposing the filter element to the heated atmosphere or getting the heated air therethrough while being installed.

As mentioned above, the filter element in accordance with the present invention has the characteristic that it is possible to use so as to expand and recover the thickness of the nonwoven fabric sheet 5% or more, by using the filter element in which the composite substrate obtained by lapping or laminating or integrating the nonwoven fabric sheet including the fiber constituted by the thermoplastic resin and the gas removal sheet is pleated, and the pleated shape of the pleated composite substrate is held by the shape retaining member, for example, under the temperature atmosphere between 50 and 80 degree C., it is possible to secure the reduced pressure loss, the reduction of the energy cost and the high air flow rate, at least in the period from the start of use to the heated time, and the filtering service life and the gas removing service life are finally elongated while keeping the high dust removing efficiency and the high gas removing performance by being heated after a certain degree of period has passed or being intentionally heated.

A description will be given of embodiments in accordance with the present invention, however, the embodiments are only preferred embodiments for easily understanding the invention, and the present invention is not limited to the contents of the embodiments.

EMBODIMENTS

Test Method of Thickness of Nonwoven Fabric Sheet or Composite Substrate

Test pieces having 10 cm square are cut from the nonwoven fabric sheet or the composite substrate before being heated or after being heated, and the test pieces are mounted on a horizontal plate in such a manner that the nonwoven fabric sheet comes to an upper side in the case of the composite substrate. Next, a flat plate having a mass of 50 g and 10 cm square is mounted on the test piece, and a distance between the horizontal plate and the flat plate is measured. The measurement is executed at totally eight positions comprising four corner portions of the flat plate and center portions of respective sides of the flat plate, and an average value of the obtained values is set to a thickness of the nonwoven fabric sheet or the composite substrate. In the case of the composite substrate, the thickness of the nonwoven fabric sheet is also measured by measuring a distance between a lower surface of the nonwoven fabric sheet and the flat plate. Further, in the case of the composite substrate processed in the filter element, the composite substrate is taken out from the filter element, and crest portions and valley portions of the pleated shape are removed. In the case that the separator is provided, the separator is also removed. Accordingly, several small pieces are joined so as to form 10 cm square, whereby the test piece is obtained.

(Filtering Performance Test Method of Nonwoven Fabric Sheet—Weight Method)

In a test method defined in ASHRAE 52.1-1992, a average gravimetric efficiency (average ASHRAE arestance) (%) and a filtering service life (dust holding capacity) (g/m$^2$) are determined after supplying SAE AC FINE dust at a face velocity of 0.25 m/sec until the pressure loss becomes 200 Pa. Further, the initial pressure loss (Pa) employs a value obtained by measuring at the face velocity of 0.1 m/sec.

(Filtering Performance Test Method of Nonwoven Fabric Sheet—Counting Method)

In a test method defined in JIS B9908 type 1, the particle collecting efficiency (%) is determined by supplying 0.3 μm of atmospheric dust at the face velocity of 0.1 m/sec.

(Filtering Performance Test Method of Filter Element—Weight Method)

In the test method defined in ASHRAE 52.1-1992, the average gravimetric efficiency (average ASHRAE arestance) (%) and the filtering service life (the dust holding capacity) (g) are determined after supplying SAE AC FINE dust at the air flow rate of 550 m$^3$/hr until the pressure loss becomes 200 Pa. Further, the initial pressure loss (Pa) employs a value obtained by measuring at the air flow rate of 550 m$^3$/sec.

Embodiment 1

A fiber web is formed by using a card machine, by mixing 80 mass % of staple fiber constituted by a compound fiber (fiber size 6.6 decitex and fiber length 64 mm) in which a core component is formed by a polypropylene resin having a melting point 160 degree C. and a sheath component is formed by a polyethylene resin having a melting point 140 degree C., and 20 mass % of staple fiber constituted by a compound fiber (fiber size 2.2 decitex and fiber length 51 mm) in which a core component is formed by a polypropylene resin having a melting point 160 degree C. and a sheath component is formed by a polyethylene resin having a melting point 140 degree C.

Next, a heating adhesion process is applied to the fiber web by using an air through type dryer under a condition of a hot air passing speed 6 m/sec by a hot air at 140 degree C., and a fiber adhesion web having a mass per unit area 50 g/m$^2$ and a thickness 0.65 mm is formed. Next, a heating compression process is applied to the fiber adhesion web by using the other air through type dryer under a condition of a hot air passing speed 10 m/sec by a hot air at 130 degree C., and a nonwoven fabric sheet having a mass per unit area 50 g/m$^2$ and a thickness 0.5 mm is prepared. A result obtained by evaluating the filtering performance of the obtained nonwoven fabric sheet is shown in Table 1.

Next, as shown in FIG. 6, the gas removing particle 3 constituted by a commercially available active carbon particle classified in a particle diameter between 0.3 and 0.5 mm (an average particle diameter 0.4 mm) is scattered to a surface of the hot melt nonwoven fabric of the cover material 7 having a mass per area unit of 40 g/m$^2$ in which the hot melt nonwoven fabric having a mass per area unit of 20 g/m² is attached to the spun-bond nonwoven fabric constituted by a polyester fiber having a mass per area unit of 20 g/m², in such a manner as to achieve a mass per area unit of 115 g/m². Subsequently, a steam treatment about 5 kg/cm² is executed for about seven second from the cover material 7 side (the hot melt nonwoven fabric side), the hot melt nonwoven fabric is plasticized and molten, the web constituted by the coupling portion 6a and the resin coagulation portion 6b made of the hot melt resin is formed, and the gas removing particle 3 is firmly fixed to the web via the resin coagulation portion 6b. Subsequently, the gas removing particles 3 are firmly fixed in correspondence to the respective particle diameters by removing the other gas removing particles than the firmly fixed gas removing particle 3, and there is obtained a first layer of lamination unit constituting the gas removing particle layer 4 adhered to the cover material 5. Further, the hot melt nonwoven fabric having the mass per area unit of 20 g/m² is lapped on the gas removing particle layer 4 (the lamination unit) in this state, the gas removing particle 3' is scattered and steam treated in such a manner as to achieve the mass per area unit of 115 g/m², and the second layer of lamination unit forming the gas removing particle layer 4' is formed through the removal of the gas removing particle which is not firmly fixed by way of precaution, thereby forming the gas removal sheet 2 having the mass per area unit of 290 g/m² and the thickness of 0.7 mm.

Next, as shown in FIG. 7, the hot melt resin is applied to the respective laminated surfaces of the gas removal sheet 2 and the nonwoven fabric sheet 1 mentioned above in accordance with the hot melt spray in such a manner as to achieve the mass per area unit of 10 g/m² simultaneously on both the surfaces, two base materials 1 and 2 are next laminated in such a manner that the applied surfaces come to the inner sides with each other, two laminated base materials 1 and 2 are pressurized by being passed between a pair of rolls which are not heated, and two base materials 1 and 2 are adhered and integrated via the hot melt resin 8, thereby forming the composite substrate 11 having the mass per area unit of 350 g/m² and the thickness of 1.2 mm. Results obtained by evaluating the obtained composite substrate are shown in Table 1.

Embodiment 2

A fiber web is formed by using a card machine, by using 100 mass % of staple fiber constituted by a compound fiber (fiber size 6.6 decitex and fiber length 64 mm) in which a core component is formed by a polypropylene resin having a melting point 160 degree C. and a sheath component is formed by a polyethylene resin having a melting point 140 degree C. Next, a heating adhesion process is applied to the fiber web by using an air through type dryer under a condition of a hot air passing speed 6 m/sec by a hot air at 140 degree C., and a fiber adhesion web having a mass per unit area 50 g/m² and a thickness 0.7 mm is formed. Next, a heating compression process is applied to the fiber adhesion web by using the other air through type dryer under a condition of a hot air passing speed 10 m/sec by a hot air at 130 degree C., and an nonwoven fabric sheet having a mass per unit area 50 g/m² and a thickness 0.55 mm is prepared. Further, in the same manner as for the embodiment 1, the gas removal sheet having a mass per area unit 290 g/m² and a thickness 0.55 mm is laminated and integrated, and a composite substrate 11 having a mass per area unit 350 g/m² and a thickness 1.25 mm is manufactured. A result obtained by evaluating the composite substrate is shown in Table 1.

Embodiment 3

A fiber web is formed by using a card machine, by mixing 80 mass % of staple fiber constituted by a compound fiber (having fiber size 6.6 decitex and fiber length 64 mm) in which a core component is formed by a polypropylene resin having a melting point 160 degree C. and a sheath component is formed by a polyethylene resin having a melting point 140 degree C., and 20 mass % of staple fiber constituted by a compound fiber (having fiber size 2.2 decitex and fiber length 51 mm) in which a core component is formed by a polypropylene resin having a melting point 160 degree C. and a sheath component is formed by a polyethylene resin having a melting point 140 degree C. Next, a heating adhesion process is applied to the fiber web by using an air through type dryer under a condition of a hot air passing speed 6 m/sec by a hot air at 140 degree C., and a fiber adhesion web having a mass per unit area 50 g/m² and a thickness 0.65 mm is formed. Next, a heating compression process is applied to the fiber adhesion web by using the other air through type dryer under a condition of a hot air passing speed 10 m/sec by a hot air at 130 degree C., and a nonwoven fabric sheet having a mass per unit area 50 g/m² and a thickness 0.5 mm is prepared. Next, a corona discharge treatment is applied to the nonwoven fabric sheet, and the nonwoven fabric sheet in which the constituting fiber is statically charged fiber. In this case, the used compound fiber is constituted by "a polyolefin thermal adhesion fiber which is constituted by a polyolefin thermal adhesion fiber to which 0.2 to 0.6 weight % of oil is attached, and in which the oil attached amount of the nonwoven fabric can be reduced to 0.001 to 0.2 weight %, and the reducing rate of the oil attached amount can become equal to or more than 60%, at a time of forming the nonwoven fabric in accordance with the heating process and/or at a time of the heating process after forming the nonwoven fabric". Further, in the same manner as for the embodiment 1, the gas removal sheet having a mass per area unit 290 g/m² and a thickness 0.55 mm is laminated and integrated, and a composite substrate 11 having a mass per area unit 350 g/m2 and a thickness 1.2 mm is manufactured. A result obtained by evaluating the composite substrate is shown in Table 1.

Embodiments 4 to 7

A fiber web is formed in the same manner as the embodiment 3, a heating adhesion process is applied to the fiber web by using an air through type dryer under a condition of respective hot air passing speeds 9 m/sec, 7.5 m/sec, 4 m/sec and 2 m/sec by a hot air at 140 degree C., thereby forming the fiber adhesion webs respectively having the mass per unit area 50 g/m² and the thicknesses 0.55 mm, 0.6 mm, 0.7 mm and 0.8 mm. The other conditions are the same as those of the embodiment 3. Accordingly, composite substrates of the embodiments 4, 5, 6 and 7 having a mass per area unit 350 g/m² and a thickness 1.2 mm are manufactured. A result obtained by evaluating the composite substrate is shown in Table 1.

Embodiment 8

A pleating process is applied to the composite substrate obtained by the embodiment 1 in such a manner that a height of a crimple is 29 mm and a pitch of the crimple (a crest interval) is 6 mm, and shape retaining means constituted by a rigid nonwoven fabric is next attached to an end surface intersecting a crest line direction of the pleat via a hot melt sheet, thereby manufacturing a filter element in which an entire dimension is 225 mm in shape retaining member side× 235 mm in a perpendicular side to the shape retaining member. A result obtained by evaluating the filtering performance of the obtained filter element is shown in Table 3. Further, a result obtained by evaluating the filtering performance after circulating the heated air (60 degree C.) of the air flow rate 550 m³/hr through the obtained filter element for 100 hours is shown in Table 3. In this case, in the air conditioner for the motor vehicle, the maximum air flow rate is generally 550 m³/hr, which corresponds to the case that the face velocity is about 25 cm/sec with respect to the composite substrate in this embodiment. Further, since the face velocity is an extremely small value, it is confirmed that there is not obtained an effect of compressing the thickness of the nonwoven fabric sheet, and an effect of preventing the nonwoven fabric sheet from expanding or recovering the thickness.

Embodiments 9 to 13

A filter element is manufactured by employing the same structures as those of the embodiment 8 except a structure that a pleating process is applied to the nonwoven fabric sheet obtained by the embodiments 3 to 7. A result obtained by evaluating the filtering performance of the obtained filter element is shown in Table 3 and Table 4. Further, a result obtained by evaluating the filtering performance after circulating the heated air (60 degree C.) of the air flow rate 550 m³/hr through the obtained filter element for 100 hour is also shown in Table 3 and Table 4.

(Comparative 1)

A fiber web is formed in the same manner as the embodiment 1, and a heating adhesion process is next applied to the fiber web by using an air through type dryer under a condition of a hot air passing speed 6 m/sec by a hot air at 140 degree C., and a fiber adhesion web having a mass per unit area 50 g/m² and a thickness 0.65 mm is formed. Thereafter, the fiber adhesion web (mass per unit area 50 g/m² and thickness 0.65 mm) is formed as nonwoven fabric sheet without applying a heating compression process to the fiber adhesion web. Further, in the same manner as for the embodiment 1, a composite substrate 11 having a mass per area unit 350 g/m² and a thickness 1.35 mm is manufactured. A result obtained by evaluating the composite substrate is shown in Table 2.

(Comparative 2)

A fiber web is formed in the same manner as the embodiment 2, and a heating adhesion process is next applied to the fiber web by using an air through type dryer under a condition of a hot air passing speed 6 m/sec by a hot air at 140 degree C., and a fiber adhesion web having a mass per unit area 50 g/m² and a thickness 0.7 mm is formed. Thereafter, the fiber adhesion web (mass per unit area 50 g/m² and thickness 0.7 mm) is formed as an nonwoven fabric sheet without applying a heating compression process to the fiber adhesion web. Further, in the same manner as for the embodiment 2, the gas removal sheet having a mass per area unit 290 g/m² and a thickness 0.7 mm is laminated and integrated, and a composite substrate having a mass per area unit 350 g/m² and a thickness 1.4 mm is manufactured. A result obtained by evaluating the composite substrate is shown in Table 2.

(Comparative 3)

A fiber web is formed in the same manner as the embodiment 3, and a heating adhesion process is next applied to the fiber web by using an air through type dryer under a condition of a hot air passing speed 6 m/sec by a hot air at 140 degree C., and a fiber adhesion web having a mass per unit area 50 g/m² and a thickness 0.65 mm is formed. Thereafter, the fiber adhesion web (mass per unit area 50 g/m² and thickness 0.65 mm) is formed as an nonwoven fabric sheet without applying a heating compression process to the fiber adhesion web. Next, a corona discharging process is applied to the nonwoven fabric sheet, and the nonwoven fabric sheet in which the constituting fiber is statically charged fiber. Further, in the same manner as for the embodiment 3, the gas removal sheet having a mass per area unit 290 g/m² and a thickness 0.7 mm is laminated and integrated, and a composite substrate having a mass per area unit 350 g/m² and a thickness 1.35 mm is manufactured. A result obtained by evaluating the composite substrate is shown in Table 2.

(Comparative 4 to 7)

A fiber web is formed in the same manner as the embodiment 3, and a heating adhesion process is next applied to the fiber web by using an air through type dryer under respective conditions of hot air passing speeds 9 m/sec, 7.5 m/sec, 4 m/sec and 2 m/sec by a hot air at 140 degree C., and fiber adhesion webs having a mass per unit area 50 g/m² and respective thicknesses 0.55 mm, 0.6 mm, 0.7 mm and 0.8 mm is formed. Thereafter, the fiber adhesion webs are formed as nonwoven fabric sheets without applying a heating compression process to the fiber adhesion webs. Next, a corona discharging process is applied to the nonwoven fabrics, and the nonwoven fabric sheet in which the constituting fiber is a statically charged fiber. Further, in the same manner as for the embodiment 3, the gas removal sheet having a mass per area unit 290 g/m² and a thickness 0.7 mm is laminated and integrated, and composite substrates having a mass per area unit 350 g/m² and thickness 1.25 mm, 1.3 mm, 1.4 mm and 1.5 mm are manufactured. A result obtained by evaluating the composite substrates is shown in Table 2.

(Comparative 8)

A filter element is manufactured by employing the same structures as that of the embodiment 8 except a structure that a pleating process is applied to the composite substrate obtained by the comparative 1. A result obtained by evaluating the filtering performance of the obtained filter element is shown in Table 2. Further, a result obtained by evaluating the filtering performance after circulating the heated air (60 degree C.) of the air flow rate 550 m³/hr through the obtained filter element for 100 hour is shown in Table 5.

(Comparatives 9 to 13)

A filter element is manufactured by employing the same structures as that of the embodiment 8 except a structure that a pleating process is applied to the composite substrate obtained by the comparatives 3 to 7. A result obtained by evaluating the filtering performance of the obtained filter element is shown in Tables 5 and 6. Further, a result obtained by evaluating the filtering performance after circulating the heated air (60 degree C.) of the air flow rate 550 m³/hr through the obtained filter element for 100 hour is shown in Tables 5 and 6.

As apparent from Tables 1 to 6, it is known that the filter elements in accordance with the embodiments 8 to 13 become in the state in which the initial pressure loss is reduced before being heated to 60 degree C., and become in the state in which the filtering service life is elongated after being heated to 60 degree C. As mentioned above, the filter element in accordance with the present invention has the characteristic it is possible to secure the reduced pressure loss, the reduction of the energy cost and the high air flow rate, at least in the period from the start of use to the heated time, and the filtering service life and gas removing service life are finally elongated while keeping the high dust removing efficiency and high gas removing performance by non-artificially or artificially heating after a certain degree of period has passed.

| Description of Reference Numerals | |
|---|---|
| 10 | filter element |
| 11 | composite substrate |
| 12a, 12b | shape retaining member |
| 13 | crimple |
| 14 | separator |
| 1 | nonwoven fabric sheet |
| 2 | gas removal sheet |
| 4 | gas removing particle layer |
| 3 | gas removing particle |
| 5 | fiber body |
| 6a | coupling portion |
| 6b | resin coagulation portion |
| 7 | cover material |
| 8 | hot melt resin |

TABLE 1

|  | Embodiment 1 | Embodiment 2 | Embodiment 3 | Embodiment 4 | Embodiment 5 | Embodiment 6 | Embodiment 7 |
|---|---|---|---|---|---|---|---|
| Mass per unit area (g/m$^2$) | 350 | 350 | 350 | 350 | 350 | 350 | 350 |
| Thickness (mm) | 1.2 | 1.25 | 1.2 | 1.2 | 1.2 | 1.2 | 1.2 |
| Thickness of nonwoven fabric sheet (mm) | 0.5 | 0.55 | 0.5 | 0.5 | 0.5 | 0.5 | 0.5 |
| Initial pressure loss (Pa) | 11 | 10.8 | 11 | 11 | 11 | 11 | 11 |
| Counting method efficiency (%) | 0 | 0 | 30 | 30 | 30 | 30 | 30 |
| Weight method efficiency (%) | 97 | 95 | 97 | 97 | 97 | 97 | 97 |
| Filtering service life (Dust holding capacity) (g/m$^2$) | 53 | 56 | 53 | 53 | 53 | 53 | 53 |
| Hot air passing speed (adhesion process) (m/s) | 6 | 6 | 6 | 9 | 7.5 | 4 | 2 |
| Hot air passing speed (compression process) (m/s) | 10 | 10 | 10 | 10 | 10 | 10 | 10 |

TABLE 2

|  | Comparative 1 | Comparative 2 | Comparative 3 | Comparative 4 | Comparative 5 | Comparative 6 | Comparative 7 |
|---|---|---|---|---|---|---|---|
| Mass per unit area (g/m$^2$) | 350 | 350 | 350 | 350 | 350 | 350 | 350 |
| Thickness (mm) | 1.35 | 1.4 | 1.35 | 1.25 | 1.3 | 1.4 | 1.5 |
| Thickness of nonwoven fabric sheet (mm) | 0.65 | 0.7 | 0.65 | 0.55 | 0.6 | 0.7 | 0.8 |
| Initial pressure loss (Pa) | 11 | 10.8 | 11 | 11 | 11 | 10.8 | 10.5 |
| Counting method efficiency (%) | 0 | 0 | 30 | 30 | 30 | 30 | 30 |
| Weight method efficiency (%) | 97 | 95 | 97 | 97 | 97 | 97 | 97 |
| Filtering service life (Dust holding capacity) (g/m$^2$) | 65 | 67 | 65 | 55 | 60 | 71 | 77 |
| Hot air passing speed (adhesion process) (m/s) | 6 | 6 | 6 | 9 | 7.5 | 4 | 2 |
| Hot air passing speed (compression process) (m/s) | — | — | — | — | — | — | — |

TABLE 3

| | Embodiment 8 (Embodiment 1) | | Embodiment 9 (Embodiment 3) | | Embodiment 10 (Embodiment 4) | |
|---|---|---|---|---|---|---|
| | — | After heating at 60 degree C. | — | After heating at 60 degree C. | — | After heating at 60 degree C. |
| Mass per unit area (g/m$^2$) | 350 | 350 | 350 | 350 | 350 | 350 |
| Thickness (mm) | 1.2 | 1.35 | 1.2 | 1.35 | 1.2 | 1.25 |
| Thickness of nonwoven fabric sheet (mm) | 0.5 | 0.65 | 0.5 | 0.65 | 0.5 | 0.55 |
| Increasing rate of thickness of nonwoven fabric sheet (%) | — | 30 | — | 30 | — | 10 |
| Initial pressure loss (Pa) | 90 | 97 | 90 | 97 | 90 | 92 |
| Counting method efficiency (%) | 0 | 0 | 25 | 23 | 25 | 23 |
| Weight method efficiency (%) | 97 | 97 | 97 | 97 | 97 | 97 |
| Filtering service life (Dust holding capacity) (g) | 25 | 31 | 25 | 31 | 25 | 27.5 |

TABLE 4

| | Embodiment 11 (Embodiment 5) | | Embodiment 12 (Embodiment 6) | | Embodiment 13 (Embodiment 7) | |
|---|---|---|---|---|---|---|
| | — | After heating at 60 degree C. | — | After heating at 60 degree C. | — | After heating at 60 degree C. |
| Mass per unit area (g/m$^2$) | 350 | 350 | 350 | 350 | 350 | 350 |
| Thickness (mm) | 1.2 | 1.3 | 1.2 | 1.4 | 1.0 | 1.5 |
| Thickness of nonwoven fabric sheet (mm) | 0.5 | 0.6 | 0.5 | 0.7 | 0.5 | 0.8 |
| Increasing rate of thickness of nonwoven fabric sheet (%) | — | 20 | — | 40 | — | 60 |
| Initial pressure loss (Pa) | 90 | 95 | 90 | 105 | 90 | 135 |
| Counting method efficiency (%) | 25 | 23 | 25 | 23 | 25 | 23 |
| Weight method efficiency (%) | 97 | 97 | 97 | 96 | 97 | 95 |
| Filtering service life (Dust holding capacity) (g) | 25 | 29 | 25 | 36 | 25 | 28 |

TABLE 5

| | Comparative 8 (Comparative 1) | | Comparative 9 (Comparative 3) | | Comparative 10 (Comparative 4) | |
|---|---|---|---|---|---|---|
| | — | After heating at 60 degree C. | — | After heating at 60 degree C. | — | After heating at 60 degree C. |
| Mass per unit area (g/m$^2$) | 350 | 350 | 350 | 350 | 350 | 350 |
| Thickness (mm) | 1.35 | 1.35 | 1.35 | 1.35 | 1.25 | 1.25 |
| Thickness of nonwoven fabric sheet (mm) | 0.65 | 0.65 | 0.65 | 0.65 | 0.55 | 0.55 |
| Increasing rate of thickness of nonwoven fabric sheet (%) | — | 0 | — | 0 | — | 0 |
| Initial pressure loss (Pa) | 97 | 97 | 97 | 97 | 92 | 92 |
| Counting method efficiency (%) | 0 | 0 | 23 | 23 | 23 | 23 |
| Weight method efficiency (%) | 97 | 97 | 97 | 97 | 97 | 97 |
| Filtering service life (Dust holding capacity) (g) | 31 | 31 | 31 | 31 | 27.5 | 27.5 |

TABLE 6

| | Comparative 11 (Comparative 5) | | Comparative 12 (Comparative 6) | | Comparative 13 (Comparative 7) | |
|---|---|---|---|---|---|---|
| | — | After heating at 60 degree C. | — | After heating at 60 degree C. | — | After heating at 60 degree C. |
| Mass per unit area (g/m$^2$) | 350 | 350 | 350 | 350 | 350 | 350 |
| Thickness (mm) | 1.3 | 1.3 | 1.4 | 1.4 | 1.5 | 1.5 |
| Thickness of nonwoven fabric sheet (mm) | 0.6 | 0.6 | 0.7 | 0.7 | 0.8 | 0.8 |
| Increasing rate of thickness of nonwoven fabric sheet (%) | — | 0 | — | 0 | — | 0 |
| Initial pressure loss (Pa) | 95 | 95 | 105 | 105 | 135 | 135 |
| Counting method efficiency (%) | 23 | 23 | 23 | 23 | 23 | 23 |
| Weight method efficiency (%) | 97 | 97 | 96 | 96 | 95 | 95 |
| Filtering service life (Dust holding capacity) (g) | 29 | 29 | 36 | 36 | 28 | 28 |

What is claimed is:

1. A filter element comprising:
    a pleated composite substrate having at least a gas removal sheet and a nonwoven fabric sheet;
    the nonwoven fabric sheet having a first thickness;
    the nonwoven fabric sheet comprising thermoplastic resin fibers, wherein the nonwoven fabric sheet is lapped or laminated on the gas removal sheet;
    the filter element further comprising at least one shape retaining member for retaining a pleated shape of the composite substrate, wherein the thermoplastic resin fibers contained in said nonwoven fabric sheet have been bound to one another by heat treatment at a first temperature which is equal to or higher than the melting point of the thermoplastic resin fibers, and wherein said bound thermoplastic resin fibers have been heat treated at a second temperature which is lower than the melting point of the thermoplastic resin fibers under compression such that strain is generated and retained in the thermoplastic resin fibers and the state of the bound and compressed thermoplastic resin fibers is stabilized so as to form the first thickness of the nonwoven fabric sheet, and wherein when heated to substantially 60 degrees C., the generated strain is released thus causing the first thickness of the nonwoven fabric sheet to increase to a second thickness; and
    the second thickness is at least five percent (5%) greater than the first thickness.

2. The filter element of claim 1, wherein the second thickness of the nonwoven fabric sheet ranges between 5% and 65% when heated to 60 degree C.

3. The filter element of claim 2, the nonwoven fabric sheet providing an average gravimetric efficiency between 50% and 99% by weight at the face velocity 0.25 m/s under the ASHRAE 52.1-1992 test condition using SAE AC FINE dust.

4. The filter element of claim 2, wherein the nonwoven fabric sheet is statically charged.

5. The filter element of claim 2, wherein a value (a) of "(1−2T/P)×100" is 20(%) to 80(%), wherein
P is a distance (mm) between pleats; and
T is a thickness (mm) of composite substrate.

6. The filter element of claim 2, wherein the nonwoven fabric sheet is structured to increase its dust holding capacity at least 5% when heated to 60 degree C., as compared to the dust holding capacity of the nonwoven fabric sheet before being heated to 60 degree C., and wherein the structure to increase the dust holding capacity is created as the nonwoven sheet thickness increases from a first thickness to a second thickness.

7. The filter element of claim 1, the nonwoven fabric sheet providing an average gravimetric efficiency between 50% and 99% by weight at the face velocity 0.25 m/s under the ASHRAE 52.1-1992 test condition using SAE AC FINE dust.

8. The filter element of claim 7, wherein the nonwoven fabric sheet is statically charged.

9. The filter element of claim 7, wherein a value (a) of "(1−2T/P)×100" is 20(%) to 80(%), wherein
P is a distance (mm) between pleats; and
T is a thickness (mm) of composite substrate.

10. The filter element of claim 7, wherein the nonwoven fabric sheet is structured to increase its dust holding capacity at least 5% when heated to 60 degree C., as compared to the dust holding capacity of the nonwoven fabric sheet before being heated to 60 degree C., and wherein the structure to increase the dust holding capacity is created as the nonwoven sheet thickness increases from a first thickness to a second thickness.

11. The filter element of claim 1, wherein the nonwoven fabric sheet is statically charged.

12. The filter element of claim 11, wherein a value (a) of "(1−2T/P)×100" is 20(%) to 80(%), wherein
P is a distance (mm) between pleats; and
T is a thickness (mm) of composite substrate.

13. The filter element of claim 11, wherein the nonwoven fabric sheet is structured to increase its dust holding capacity at least 5% when heated to 60 degree C., as compared to the dust holding capacity of the nonwoven fabric sheet before being heated to 60 degree C., and wherein the structure to increase the dust holding capacity is created as the nonwoven sheet thickness increases from a first thickness to a second thickness.

14. The filter element of claim 1, wherein the value (a) of "(1−2T/P)×100" is 20(%) to 80(%), wherein
P is a distance (mm) between pleats; and
T is a thickness (mm) of composite substrate.

15. The filter element of claim 5, wherein the nonwoven fabric sheet is structured to increase its dust holding capacity at least 5% when heated to 60 degree C, as compared to the dust holding capacity of the nonwoven fabric sheet before being heated to 60 degree C, and wherein the structure to increase the dust holding capacity is created as the nonwoven sheet thickness increases from a first thickness to a second thickness.

16. The filter element of claim 1, wherein increasing the second thickness increases its dust holding capacity at least 5% when heated to 60 degree C.

* * * * *